United States Patent [19]
Tavallaei et al.

[11] Patent Number: 5,951,661
[45] Date of Patent: Sep. 14, 1999

[54] BUS PROTOCOL VIOLATION MONITOR SYSTEMS AND METHODS

[75] Inventors: Siamak Tavallaei; Eric E. Rose, both of Spring, Tex.

[73] Assignee: Compaq Computer Corporation, Houston, Tex.

[21] Appl. No.: 08/911,248

[22] Filed: Aug. 15, 1997

[51] Int. Cl.⁶ .................................................. G06F 13/00
[52] U.S. Cl. .............................................. 710/105; 714/39
[58] Field of Search ............................... 395/285, 184.01, 395/183.15, 181, 306, 309, 280; 370/242; 371/20.1; 710/100, 105; 714/39

[56] References Cited

U.S. PATENT DOCUMENTS

| | | | |
|---|---|---|---|
| 4,534,023 | 8/1985 | Peck et al. | 370/384 |
| 5,347,524 | 9/1994 | I'Anson et al. | 395/183.15 |
| 5,526,289 | 6/1996 | Dinh et al. | 364/557 |
| 5,574,667 | 11/1996 | Dinh et al. | 364/557 |
| 5,631,800 | 5/1997 | Jin et al. | 361/103 |
| 5,634,038 | 5/1997 | Saitoh | 395/490 |
| 5,638,895 | 6/1997 | Dodson | 165/121 |
| 5,751,975 | 5/1998 | Gillespie et al. | 395/306 |
| 5,754,552 | 5/1998 | Allmond et al. | 370/465 |
| 5,819,027 | 10/1998 | Budelman et al. | 395/184.01 |
| 5,864,653 | 1/1999 | Tavallaei et al. | 315/181 |

OTHER PUBLICATIONS

"Remote 8–bit I/O expander for I²C–Bus" Data Sheet; *Philips Semiconductor*; Apr. 2, 1997; pp. 1–23.

Farnsworth, C.; "Low Power Implementation of an I²C–Bus Expander"; http://maveric0.uwaterloo.ca/amulet/publications/thesis farnsworth94 msc.html; Jun. 16, 1997; one page.

Collins, Andy; "Interfacing TMS370 Microcontrollers to I²C–Bus ICs"; Logikos; wysiwyg://lll/http://www.logikos.com/tms370.htm1; Jun. 16, 1997; pp. 1–6.

"I²C–Bus Expander" Application Note AN036; *Philips Semiconductors Programmable Logic Devices*; Oct., 1993; 22 pages.

"The PCI (Peripheral Component Interconnect) Bus"; Aug. 6, 1997; pci.txt at www.gl.umbc.edu; pp. 1–7.

"Re: What's the difference between locks and semaphores?"; Jim Barton (jmb@patton.wpd.sgi.com) Jan. 2, 1991; Accessed Jun. 16, 1997; http://www.sgi.com/Archive/comp.sys.sgi/1991/Jan/0006.html.

"Internal Data Structures, 6.4.3 Semaphores" Basic Concepts; Accessed Jul. 11, 1997; http://linux.www.db.erau.edu/LPG/node47.html.

"The PCI Local Bus"; Accessed Jul. 27, 1 997; http://www.rns.com/whats new/wh pci.html.

"PCI Bus Technology" Information Brief; *IBM Personal Computing Solutions*; Accessed Jul. 27, 1997; http://www.us.pc.ibm.com/infobrf/ibpci.html.

"PCI164 Screamer Functional Diagram" Microway; Accessed Jul. 27, 1997; http://www.microway.com/block.html.

"The PCI (Peripheral Component Interconnect) Local Bus" description of PCI Bus; Accessed Jul. 27, 1997; http://www.sundance.com/pci.html.

"CMOS Bus Switches Provide Zero Delay Bus Communication" Application Note AN–09; *Quality Semiconductor Inc.*; date unknown; pp. 1–9.

"High–Performance CMOS Analog 8–Channel Switch" QS4A05Q Preliminary; *Quality Semiconductor Inc.*; May 30, 1996; pp. 1–7.

"Quickswitch® Converts TTL Logic to Hot Plug Operation" Application Note AN–13; *Quality Semiconductor Inc.*; date unknown; pp. 1–5.

"The PCI (Peripheral Component Interconnect) Bus"; Aug. 6, 1997; pci.txt at www.gl.umbc.edu; pp. 1–7.

*Primary Examiner*—Gopal C. Ray
*Attorney, Agent, or Firm*—Jenkens & Gilchrist P.C.

[57] ABSTRACT

A computer system employing a bus protocol violation monitor system and method. The monitor system includes a bus wait timer logic circuit which comprises a state machine that receives a portion of the bus interface control signals, a programmable timer module and a plurality of data selectors that are actuatable responsive to a control input. In addition to storing the violation information in a register, the system provides for interrupts with graded levels of priorities.

13 Claims, 7 Drawing Sheets

BUS PROTOCOL VIOLATION MONITOR SYSTEMS AND METHODS

BACKGROUND OF THE INVENTION

1. Technical Field of the Invention

The present invention relates generally to the field of computer systems. More particularly, the present invention is drawn to bus protocol monitoring systems and methods which detect a violation relating to one or more of bus interface control signals.

2. Description of Related Art

Networks serve the purpose of connecting many different personal computers (PC's), workstations, or terminals to each other, and to one or more host computers, printers, file servers etc., so that expensive computing assets, programs, files and other data may be shared among many users.

In a network utilizing a client/server architecture, the client (personal computer or workstation) is the requesting a machine and the server is the supplying machine, both of which may preferably be connected via the network, such as a local area network (LAN), wide area network (WAN) or metropolitan area network (MAN). This is in contrast to early network systems that utilized a mainframe with dedicated terminals.

In a client/server network, the client typically contains a user interface and may perform some or all of the application processing and, as mentioned above, can include a personal computer or workstation. The server in a client/server network can be a high-speed microcomputer or minicomputer, and in the case of a high-end server, can include multiple processors and mass data storage devices such as multiple CD-ROM drives and multiple hard drives, preferably with Redundant Array of Inexpensive Disk (RAID) protection. An exemplary server such as a database server maintains the databases and processes requests from the client to extract data from or update the database. An application server provides additional business processing for the clients. The network operating system (NOS) together with the database management system (DBMS) and transaction monitor (TP monitor) are responsible for the integrity and security of the server.

Client/server networks are widely used throughout many different industries and business organizations, especially where mission-critical applications requiring high performance are routinely launched. The mass storage and multi-processing capabilities provided by current client/server network systems (for example, the high-end servers) that run such applications permit a wide range of essential services and functions to be provided through their use.

As can be appreciated, many businesses are highly dependent upon the availability of their client/server network systems to permit essential network services and functions to be carried out. As client/server network systems become increasingly essential to the everyday operations of such businesses, additional steps need to been taken in the design and construction of the server in the client/server network system to ensure its continuous availability to the clients. That is to say, in the design and construction of a server, steps need to be taken to ensure that the server can be operated with little or no downtime.

It can be appreciated by those skilled in the art that high availability, reliability and serviceability are valuable design aspects in ensuring that a server is a "zero downtime" system that will operate with little or no downtime. The modularity of components within a server has been recognized as an important design consideration in ensuring that the downtime of a server will be minimized. Modules can be removed and examined for operability or other purposes much easier than permanently mounted fixtures within a server chassis. When various components of a server can be provided in a modular form, they can also be readily replaced to maintain the operational status of the server with minimal downtime.

Removable modular components may include disc drives and power supplies. As described above, the removability of modular components allows for better overall serviceability of the computer system which is a distinct advantage. For example, a defective power supply in the server generally requires prompt replacement in order to limit downtime. Modular components and connectors facilitate prompt replacement and are thus popular in many computer designs.

Originally, a rule of practice in the maintenance of modular components or printed circuit boards of a server was that of turning the power to the server off before any modular components or printed circuit boards were removed from or added to the chassis or support frame of the server. Recent innovations have centered around a highly desirable design goal of "hot-pluggability" which addresses the benefits derived from inserting and removing modular components and printed cards from the chassis of the server when the server is electrically connected and operational. It can be readily appreciated that modularization and hot-pluggability can have a significant bearing on the high availability aspect of a high-end server.

Hot-pluggable components may include storage or disc drives, drive cages, fans, power supplies, system I/O boards, control boards, processor boards, and other sub-assemblies. The ability to remove these constituent components without having to power down the server allows for better overall serviceability of the system, which is a distinct advantage to both the user and the maintenance technician.

Component redundancy has also been recognized as an important design consideration in ensuring that a server will operate with little or no downtime. Essentially, component redundancy is typically provided in a system to better ensure that at least one of the redundant components is operable, thereby minimizing the system downtime. With component redundancy, at least two components are provided that can perform the same function, such that if one of the components becomes faulty for some reason, the operation fails over to the redundant component. When at least one of the redundant components is operable, continued operation of the computer system is possible even if others of the redundant components fail. To further enhance reliability and serviceability, redundant components have been made hot-pluggable.

Dynamic reconfiguration of a server system can also be accomplished by providing upgradable modular components therein. As can be readily appreciated, this objective can be accomplished by the addition or substitution of components having different circuits, preferably updated or upgraded, disposed therewithin. When components are redundant and hot pluggable, reconfiguration of the server is often possible without taking the server offline.

Another important design aspect with respect to providing redundant and hot pluggable components in a server system is to ensure and maintain a safe working environment while the server is operating and being repaired or upgraded. Accordingly, when the system components are swapped or upgraded, the exposure of hot connectors and contacts must be kept to a minimum. It can be appreciated by those skilled in the art that further developments in this area would significantly enhance the reliability and serviceability aspects of a high-end server system.

To further enhance the serviceability of server systems, additional innovations may be required in the design and construction of diagnostic sub-systems thereof. In existing client/server network systems it is often difficult to obtain in a timely manner important diagnostic data and information corresponding to a component failure in order to facilitate the quick serviceability of the server. Therefore, it can be appreciated that the more information that can be readily provided to locate a defective component or problem with the server, the better is the optimization of the amount of time the server is up and running.

It should be readily understood that the aspects of high availability, reliability and serviceability of computer systems are, at least in part, inter-related to the performance of such systems. For example, a poorly performing system is less likely to be highly available or reliable because such poor performance may typically result in persistent malfunctioning. As is known in the art, a significant parameter of system performance is the health of a conductive pathway, i.e., a bus provided in a system.

As is well-known in the art, computer system buses, having a plurality of conductive transmission lines, provide the means for interconnecting a plurality of electronic devices such that the devices may communicate with one another. These buses carry information including address information, control information, and data, in a logical manner as dictated by the design thereof. This logical manner is commonly referred to as the bus protocol. It is convenient to visualize the bus protocol as a combination of a "data protocol" portion and a "control protocol" portion. The data protocol portion relates to the rules concerning the actual data transfer itself and the signal conditions necessary therefor. The control protocol portion, on the other hand, may be visualized as the suite of interface control signals responsible for the operation of the bus itself.

It is known that data transfer on computer buses may sometimes be afflicted with errors. Accordingly, many high-performance buses, for example, the Peripheral Component Interconnect (PCI) bus, typically include in their bus protocol a set of signals for reporting any data transfer errors. While such features are useful in detecting and isolating data transfer errors (for example, data/address parity errors and the like), current technologies do not address or consider various anomalous conditions that might occur from time to time in the interface control signals themselves.

It may be appreciated that because the interface control signals (i.e., the control protocol portions) are ultimately responsible for the trouble-free operation of a bus, any violations associated therewith may cripple a bus system, thereby adversely impacting a computer system in which it is disposed. For example, it is known that some of the control protocol violations may lead to various bus lock-up or hang conditions that may result in significant system downtime.

Although various systems for monitoring data protocol errors have been known for some time, there are at present no known solutions that address control protocol violations. Accordingly, there has arisen a significant need for systems and methods for monitoring bus protocol violations.

SUMMARY OF THE INVENTION

The present invention overcomes the above-mentioned problems as well as other shortcomings and deficiencies of existing technologies by providing a computer system which comprises: a plurality of devices; a bus for interconnecting the plurality of devices, the bus being operable with a protocol, which protocol comprises a control protocol portion; and a protocol violation monitor for monitoring a violation relating to the control protocol portion. In a presently preferred embodiment of the computer system of the present invention, the bus comprises a Peripheral Component Interconnect (PCI) bus. The exemplary protocol violation monitor comprises a state machine for receiving a plurality of control signals, which control signals comprise at least a portion of the control protocol portion, the state machine generating a timer counter signal responsive to the plurality of control signals; a structure for generating at least one control input signal, which structure may comprise hardware, software or firmware; and a structure for producing an indication that the violation relating to the control protocol portion has occurred. The structure producing the indications preferably comprises: a programmable timer module having an input signal and an output signal; a first data selector disposed between the state machine and the programmable timer module, the first data selector being actuatable responsive to the control input signal; a second data selector coupled to the output signal of the programmable timer module, the second data selector being actuatable responsive to the control input signal; a register coupled to the second data selector, the register at least for storing information relating to the violation; a third data selector coupled to the register, the third data selector being actuatable responsive, at least in part, to the control input signal, the third data selector generating the indication of the violation.

In another aspect, the present invention is drawn to a bus protocol monitoring method, comprising the steps of: detecting whether there is a violation relating to a control protocol portion of the bus protocol; and generating information relating to the violation. In one exemplary embodiment, the bus protocol monitoring method further includes the step of: storing the information relating to the violation. In another exemplary embodiment, the bus protocol monitoring method also includes the steps of: comparing the information to a threshold; and producing an interrupt responsive to the comparison step. In a yet another exemplary embodiment, the method includes the step of producing a non-maskable interrupt (NMI) responsive to the comparison step.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
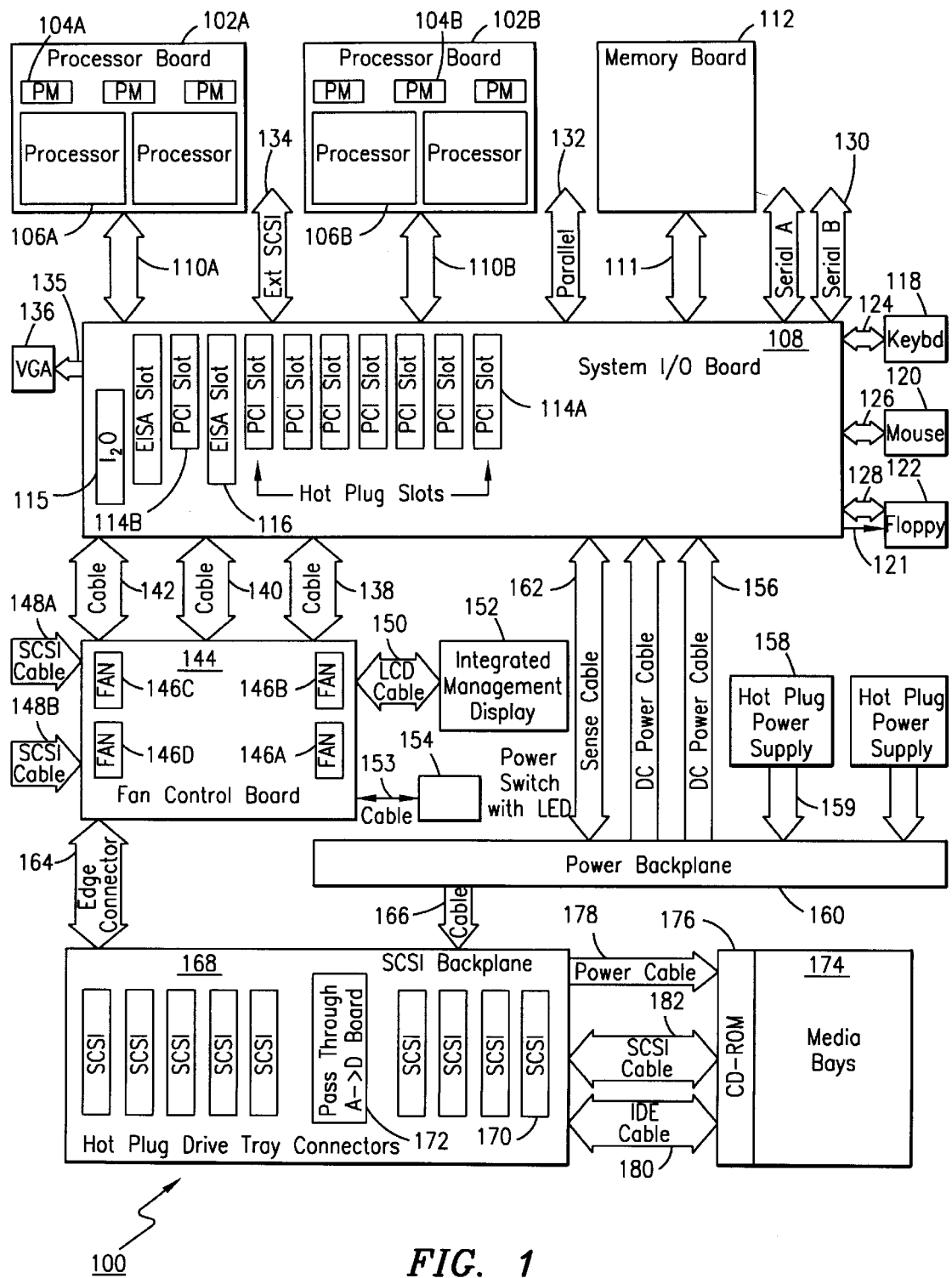
FIG. 1 illustrates a board-level block diagram of a presently preferred exemplary embodiment of a computer system in which the teachings of the present invention may be utilized.

Referring now to the Drawings wherein like or similar elements are designated with identical reference numerals throughout the several views, and wherein the various elements depicted are not necessarily drawn to scale, and, in particular, to FIG. 1, there is shown a board-level block diagram of a presently preferred exemplary computer system 100 in which the teachings of the present invention may be beneficially employed. It should be understood by those skilled in the art that while the exemplary computer system 100 is preferably organized as a "zero downtime," highly available, high-end server system, the present invention may be practiced in virtually all types of computers.

The exemplary computer system 100 may comprise a plurality of processor boards, for example, processor boards 102A and 102B, each of which, in turn, may include at least one processor such as, for example, processors 106A and 106B, respectively. The processor boards 102A and 102B may also include, respectively, a plurality of power modules. For example, power modules 104A and 104B are shown herein.

Each of the processor boards 102A and 102B is connected to a system board 108 via a suitable bus connector or slot, for example, bus connector slots 110A and 110B, respectively. In the exemplary computer system 100, the presently preferred bus connector slots are compatible to be operable with the Gunning Transistor Logic (GTL) bus protocol. Furthermore, as will be seen hereinbelow, the system board 108 in the exemplary embodiment also contains a plurality of input/output (I/O) subsystems. Accordingly, the system board 108 may also be interchangeably referred to as the system I/O board in the following Detailed Description.

Continuing to refer to FIG. 1, a memory board 112 is also coupled to the system board 108 through a memory connection slot 111. In the exemplary computer system 100, the memory board 112 may comprise several dual in-line memory modules (DIMMs) having known and heretofore unknown sizes, for example, 8 MB, 16 MB, 32 MB, 64 MB, 128 MB, and 256 MB. As can be appreciated by those skilled in the art, the memory provided with the memory board 112 may be organized in any fashion.

The exemplary system board 108 comprises a plurality of expansion slots, suitable for different bus types. Further, these expansion slots may be selectively provided with "hot-pluggable" capability. One of ordinary skill in the art can readily appreciate that the ability to replace an expansion card (not shown), receivable at an expansion slot, without powering down the system 100 contributes to rendering the system 100 a "zero downtime" system with high availability. In the exemplary computer system 100, the plurality of expansion slots comprises those that may be operable with the Peripheral Component Interconnect (PCI) bus type (for example, slots 114A and 114B) as well as those slots that are compatible with the Extended Industry Standard Architecture (EISA) bus type (for example, slot 116). It should be appreciated that either category of expansion slots may be provided with hot-pluggability. The system board 108 may additionally comprise serial port connections, for example, serial connector 130, parallel port connections, for example, parallel connector 132, and a connector 134 compatible with the Small Computer System Interface (SCSI) bus type.

Still continuing to refer to FIG. 1, the system board 108 is coupled to a host of input and output devices via cables, for example, a keyboard 118 with cable 124, a pointing device 120 with cable 126, a flexible disk drive 122 with cable 128, and a monitor 136 with cable 135. As can be seen, a separate power connection path 121 is also provided between the flexible disk drive 122 and the system board 108.

The exemplary system board 108 may also comprise an "intelligent I/O" bus connector 115 for accelerating the performance of selected PCI-compatible expansion slots. A fan control board 144 is coupled to the system board 108 through a SCSI cable 142, a miscellaneous cable 140 and an Integrated Drive Electronics (IDE) cable 138. The fan control board 144 preferably comprises one or more fan connectors, for example, fan connectors 146A–146D, which fan connectors are used for coupling hot-pluggable fans. The fan control board 144 may be provided with additional SCSI-compatible cables, for example, cables 148A and 148B, a display cable 150 coupled to an Integrated Management Display (IMD) unit 152, and a power switch cable 153 coupled to a power switch 154.

The miscellaneous cable connector 140, which joins the fan control board 144 with the system board 108, preferably contains signals generated by the IMD unit 152, various interlock signals provided by an interlock cabling system (not shown) interconnecting various boards, temperature signals, fan control signals, audio signals et cetera.

The system board 108 of the exemplary computer system 100 is coupled to a power backplane 160 via a sense cable 162 and at least one DC power cable 156. At least one hot plug power supply unit 158 is connected to the power backplane 160 through a hot plug power connector 159. Both the fan control board 144 and the power backplane 160 are coupled to a SCSI backplane 168 via an edge connector 164 and a power-SCSI backplane cable 166, respectively. The SCSI backplane comprises one or more SCSI drive tray connectors, for example, tray connector 170. In the exemplary computer system 100, the SCSI drive tray connectors are also provided with the hot plug capability in order to enhance the high availability aspect thereof. A media power cable 178 connects the SCSI backplane 168 to a media bay 174 and CD-ROM drive 176. A media SCSI cable 182 and an IDE cable 180 are also disposed between the SCSI backplane 168 and the CD-ROM/media bay 176/174.

Figure 2:
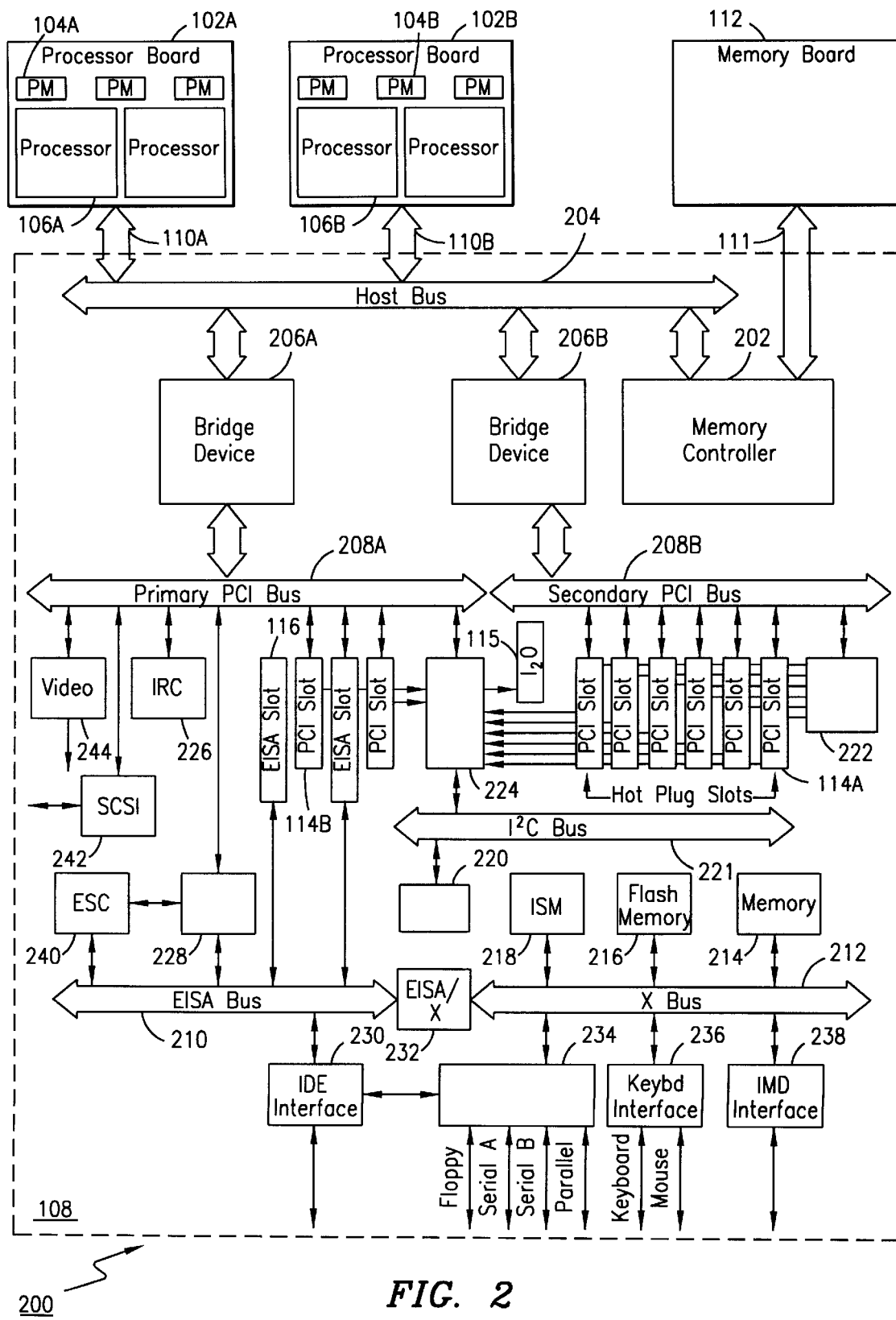
FIG. 2 depicts a device-level block diagram of a system board used in the presently preferred exemplary embodiment of the computer system in which the teachings of the present invention are advantageously utilized.

Referring now to FIG. 2, there is shown a device-level block diagram 200 of the system I/O board 108 provided in the exemplary computer system 100, wherein the teachings of the present invention may be practiced. As described in the foregoing with reference to FIG. 1, the processor boards 102A and 102B are connected to the system board 108 via bus connector slots 110A and 110B, respectively. The bus connector slots 110A and 110B are, in turn, coupled to a host bus 204 disposed on the system board 108. In the preferred exemplary embodiment, the host bus 204 uses the Gunning Transistor Logic protocol for enabling high-speed, low-power operation. As is known in the art, the GTL voltage swings between logic high and logic low are typically lower than those for the Complementary Metal Oxide Semiconductor (CMOS) logic or the Transistor-Transistor Logic (TTL). In addition to the bus connector slots 110A and 110B, the following exemplary devices are disposed on the host bus 204: a memory controller 202, a first bus-to-bus bridge 206A and a second bus-to-bus bridge 206B. The bridge 206A is provided for bridging between the host bus 204 and a primary PCI bus 208A, whereas the bridge 206B is provided for bridging between the host bus 204 and a secondary PCI bus 208B. Coupled to the memory controller 202 is the memory board 112 via the memory board connection slot 111.

In addition to the bridge device 206A for coupling to the host bus 204, the primary PCI bus 208A is connected to the following exemplary devices: a video controller 244, a PCI-EISA bridge 228, a SCSI controller 242, an Integrated Remote Console (IRC) controller 226, an application specific device 224, and at least one expansion slot 114B.

In a presently preferred exemplary embodiment of the computer system 100, the IRC controller 226 is provided as a "hidden" device that resides on the primary PCI bus 208A. The presently preferred functionality of the IRC controller 226 performs, inter alia, as follows: it examines and records video activity that is passed to firmware through the System Management Interrupt (SMI). It also allows a remote user to reboot or power-cycle the computer system 100. Further, the IRC controller 226 provides for remote modification such that a remote user can modify any IRC configuration or user setting, preferably after proper authentication.

The device 224 is preferably provided as an application specific integrated circuit (ASIC) that operates as a latching system for signals that indicate the health and operability of various devices and system within the exemplary computer system 100. Its functionality preferably includes, for example, bus arbitration, Inter-Integrated Circuit ($I^2C$) bus master controller function, bus utilization monitoring, semaphore logic and timer functions. It can be seen that the device 224 is coupled to an $I^2C$ bus 221 and the intelligent I/O bus connector 115 in order to facilitate some of these functions.

Continuing to refer to FIG. 2, the secondary PCI bus 208B is coupled to a plurality of expansion slots, for example, slot 114A, which are preferably provided with the hot plug capability. An application specific device 222 is also coupled to the secondary PCI bus 208B to provide hot plug slot control and PCI bus arbitration.

The $I^2C$ bus 221, for which bus the device 224 provides the master controller functionality, is preferably coupled to a plurality of memory devices although only one such device, for example, EEPROM 220, is shown. In addition, in the preferred exemplary computer system 100, the $I^2C$ bus 221 goes to a sense connector (not shown), the processor board bus connector slots 110A and 110B, and the memory board connector slot 111.

The PCI-EISA bridge 228, disposed between an EISA bus 210 and the primary PCI bus 208A, preferably includes, for example, a PCI interface, PCI arbiter, EISA interface, EISA data swap logic, and an interface to an EISA System Component (ESC) 240. In the exemplary embodiment, the ESC 240 preferably includes an EISA bus controller, a Direct Memory Access (DMA) controller, an EISA arbiter, at least one interrupt controller which may be programmable, several timers and support logic.

In addition to the expansion slots, for example, slot 116, the EISA bus 210 is connected to the ESC 240, a bridge 232 to an 8-bit buffered EISA bus 212 (also referred to as the X bus), and an IDE interface 230. The X bus is typically used by devices that have low output drive, and cannot sink the typical current (at around 24 mA) required by the standard EISA bus type. In the exemplary computer system 100, the following devices are typically provided on the X bus 212: a flash memory 216 for storing system BIOS and system management BIOS codes, an IMD interface 238, a memory 214 (preferably provided as nonvolatile RAM), an Integrated System Management (ISM) device 218, a keyboard controller 236 for interfacing the keyboard 118 and pointing device 120 (both depicted in FIG. 1), and a peripheral controller 234 (preferably provided as an ASIC) for controlling such devices as flexible disk drives, parallel ports, and serial ports. It can be seen that the peripheral controller 234 is preferably coupled to the IDE interface 230 in addition to the X bus 212.

Since the teachings of the present invention are exemplified herein in particular reference to a PCI bus, such as the PCI buses 208A and 208B, a brief description relating to the control signals associated therewith is deemed appropriate, and will be provided immediately hereinbelow.

As is known, the PCI interface requires various signals to handle data and addressing, interface control, arbitration, and system functions. Some of the relevant signals, including the interface control signals, are described as follows. By convention, a "__" symbol at the end of a signal name indicates that the active state occurs when the signal is at a low voltage (i.e., active LOW).

1. CLK

The CLK (clock) signal, which is an input signal to every PCI-compliant device, provides a time base for all transactions on a PCI bus.

2. FRAME__

The FRAME__ (cycle frame) signal is driven by the current master device to indicate the beginning and duration of an access. The FRAME__ is asserted to indicate that a bus transaction is commencing. As long as the FRAME__ signal is asserted, information transfers continue. On the other hand, FRAME__ is de-asserted when the transmission is in its final phase or has completed.

3. TRDY__

The TRDY__ (target ready) signal indicates the target device's ability to complete the current data phase of the bus transaction. The TRDY__ signal is used in conjunction with the IRDY__ signal described hereinbelow. A data phase is completed on the rising edge of any clock cycle where both the TRDY__ and the IRDY__ signals are asserted. During a read operation, the TRDY__ indicates that valid data is present on the Address/Data (AD) signal lines. During a write operation, the TRDY__ signal indicates that the target device is ready to accept data. One or more wait cycles may be inserted until both the IRDY__ and TRDY__ signals are asserted synchronously.

4. IRDY__

The IRDY__ (initiator ready) signal indicates the initiating device's (or, master device's) ability to complete the current data phase of the transaction. As mentioned above, the IRDY__ signal is used in conjunction with the TRDY__ signal. A data phase is completed on any clock cycle when both the IRDY__ and TRDY__ signals are asserted. During a write operation, the IRDY__ signal indicates that valid data is present on the AD signal lines. On the other hand, during a read operation, the IRDY__ signal indicates that the master device is prepared to accept data. One or more wait cycles may be inserted until both the IRDY__ and TRDY__ signals are asserted synchronously.

5. DEVSEL__

The DEVSEL__ (device select) signal, when actively driven, indicates that the driving device has decoded its address as the target device for the current bus transaction. As in input, the DEVSEL_ signal indicates whether any device on the bus has been selected.

6. REQ_

The REQ_ (request) signal, asserted by a master device, indicates to a central bus arbiter that the device wants to gain control of the bus. The REQ_ signal is a point-to-point signal, and every master device and master-slave device has its own REQ_ signal connection with an arbiter.

7. GNT_

The GNT_ (grant) signal indicates to the master device that access to the bus has been granted by the arbiter. Like the REQ_ signal, the GNT_ signal is a point-to-point signal, and every master and master-slave device has its own GNT_ signal connection to the arbiter.

8. PERR_

The PERR_ (parity error) signal is used only for the reporting of data parity errors during all bus transactions except a Special Cycle command. The PERR_ signal pin is sustained tri-state and must be driven active by the agent receiving data two clock periods following the data when a data parity error is detected. An agent cannot report a PERR_ until it has claimed the access by asserting DEVSEL_ (for a target) and completed a data phase or is the master of the current bus transaction.

9. SERR_

The SERR_ (system error) signal is for reporting address parity errors, data parity errors that may occur during a Special Cycle command, or any other system error where the result will be catastrophic. SERR_ is pure open drain and is actively driven for a single bus clock period by the agent reporting the error. The agent that reports SERR_ to the operating system does so anytime SERR_ is sampled asserted.

10. IDSEL

The IDSEL (initialization device select) signal is used as a chip select during configuration read and write transactions.

11. STOP_

The STOP_ signal indicates that the current target is requesting the master to stop the current bus transaction.

12. LOCK_

The LOCK_ signal indicates an atomic operation that may require multiple bus transactions to complete. When LOCK_ is asserted, non-exclusive transactions may proceed to an address that is not currently locked.

As can be appreciated by those skilled in the art, the error reporting signals, SERR_ and PERR_, are used typically for the reporting of parity violations that might arise from time to time during a bus transaction. However, as has been remarked in the foregoing, there are several situations where a bus violation is not related to the actual data transmission per se, but rather to an anomalous condition involving the interface control signals. Although these "control protocol" violations may have a significant impact on the overall system performance, current technologies do not address such violations. Nor do they provide any techniques for monitoring, detecting or responding to these violations.

Figure 3:
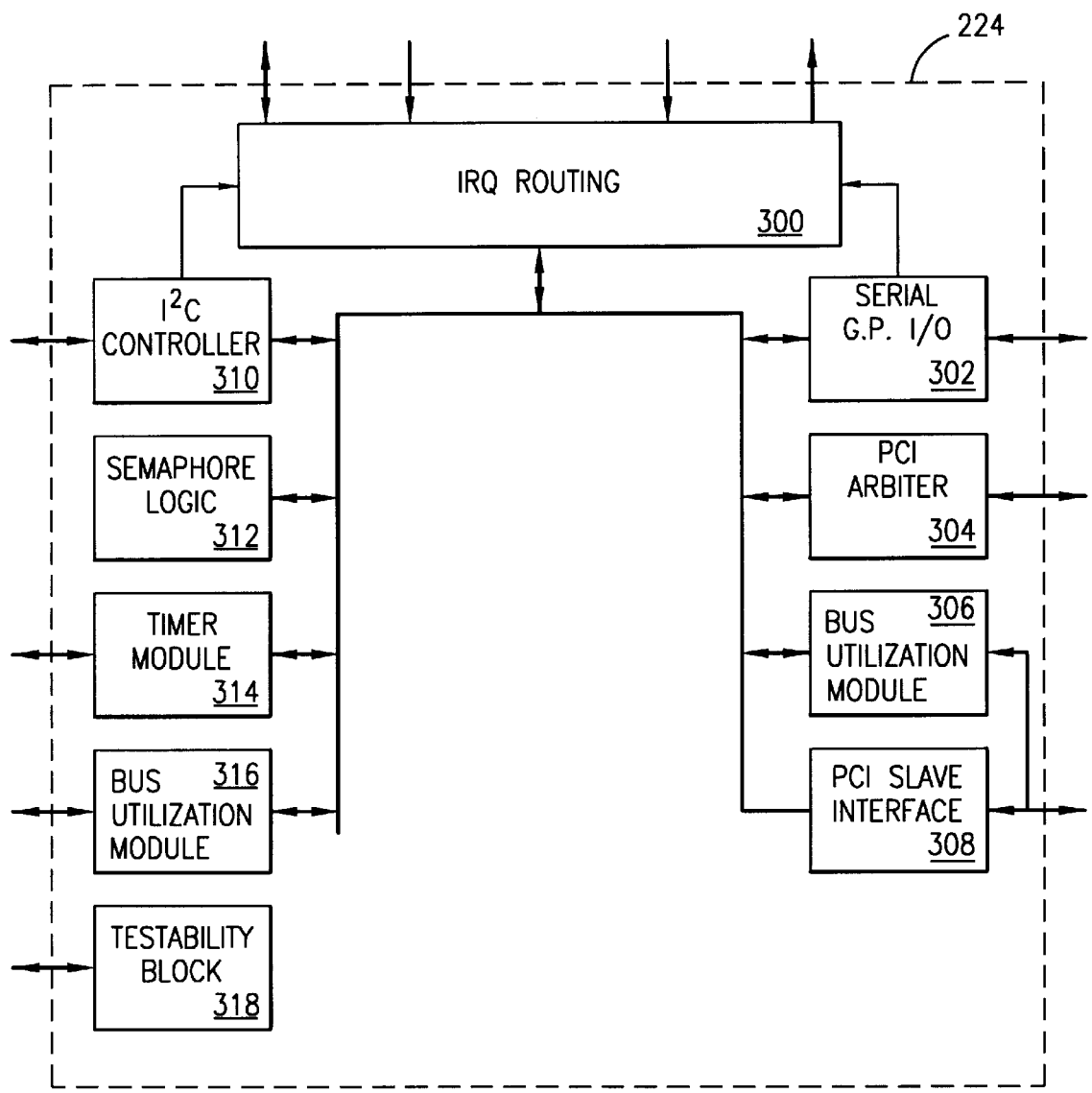
FIG. 3 illustrates a block diagram of an application-specific device used in the presently preferred exemplary embodiment of the computer system in which the teachings of the present invention may be embodied.

Referring now to FIG. 3, a block diagram of the application-specific device 224 is shown. As has been remarked in the reference to FIG. 2, the device 224 is preferably responsible for interrupt routing, the I²C bus control, PCI bus utilization, et cetera. The various features of the presently preferred exemplary embodiment of the device 224 are preferably accessed via a PCI slave interface 308. The internal registers of the device 224 are preferably clocked from a clock associated with the PCI slave interface 308, although in the exemplary embodiment, a testability block 318 responsible at least in part for the Boundary Scan logic and a bus utilization module 306 may be excepted from this clocking feature.

An IRQ routing block 300 is provided for handling at least in part, various PCI-associated interrupt requests (IRQs). One or more bus utilization modules (for example, modules 306 and 316) may be provided in the device 224 that are responsible for reporting the aggregate bus utilization and aggregate data transfer for the PCI buses 208A and 208B (shown in FIG. 2). These modules are preferably connected to the FRAME_, IRDY_ and TRDY_ signals associated with the PCI buses 208A and 208B. One or more bus utilization registers in the modules 306 and 316 report Bus_Not_Idle time (that is, Bus_Busy time) on the relevant PCI bus in PCI clock cycles by observing the FRAME_ and IRDY_ signals. One or more data transfer phase registers in these modules report the number of PCI clock cycles during which data is transferred on the relevant PCI bus.

Continuing to refer to FIG. 3, a PCI arbiter 304 is provided in the device 224 for facilitating PCI bus arbitration, preferably by using a Round-Robin algorithm. Each master or master-target on the PCI buses 208A and 208B is connected to the PCI arbiter 304 by its GNT_ and REQ_ signals. A serial, general purpose I/O module 302, an I²C controller 310, and a semaphore logic module 312 are also provided in the presently preferred exemplary embodiment of the device 224. The serial I/O module 302 is designed to shift preferably 32 bits of data in both directions. External logic circuitry (not shown) may be provided for the serial-to-parallel conversion for serially shifted data. The I²C controller 310 preferably provides a two-pin serial interface which may be connected to a variety of slave peripherals, including, for example, temperature sensors, analog-to-digital converters, non-volatile memories, et cetera. The two-pin serial interface, which controls bi-directional, serial data transmissions, includes a serial clock signal and a serial data signal.

In addition, a general purpose timer module 314 is also provided in the device 224, which timer module may be utilized for practicing the teachings of the present invention. The timer module 314 is preferably a programmable 32-bit timer that is clocked by the CLK signal associated with the PCI slave interface 308.

Figure 4:
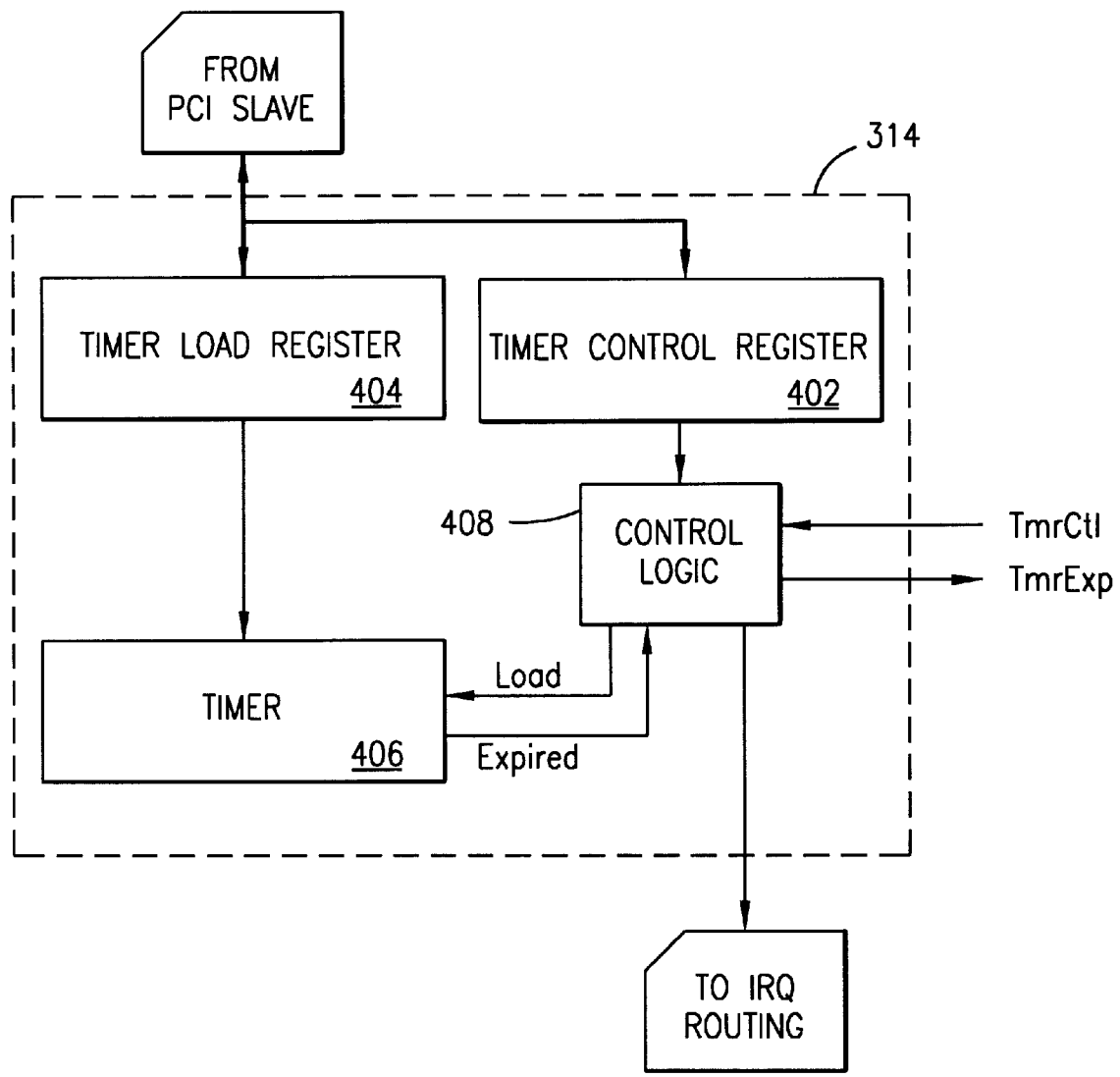
FIG. 4 illustrates a block diagram of an exemplary timer module for utilizing the teachings of the present invention.

FIG. 4 depicts a block diagram of the presently preferred exemplary timer module 314 in further detail. The timer module 314 has one output, TmrExp, for indicating the expiration time (a value stored in a timer counter 406) thereof. One input, denoted by TmrCtl, is used for controlling the timer counter 406 through a control logic block 408. The expiration time for the timer module 314 is preferably programmed through a Timer Load Register 404. The expiration time, accordingly, is equal to the value of the Timer Load Register 404 multiplied by the period of the CLK signal associated with the PCI slave interface 308. In a presently preferred embodiment, the maximum delay, accordingly, from TmrCtl to TmrExp is about 2.147 minutes based on a 33 MHZ clock. Further, using a minimum delay of 0 causes TmrExp to be always asserted. While a default value of 2 seconds is used in an exemplary embodiment, writing to the Timer Load Register 404 causes the Timer Module 314 to load the new Timer Load Register value preferably within one PCI CLK period.

As can be understood from the foregoing, the Timer Module 314 is clocked by the CLK signal and is reset to its default value by an RST signal. The functionality of the Timer Module 314 is preferably controlled by writing to a Timer Control Register 402. In an exemplary embodiment, the following functions are described based on the contents of the Timer Control Register 402:

| Bit | Name | Value | Description |
| --- | --- | --- | --- |
| 0 | TimerMode | 1 | When Timer 406 expires, halt. |
|  |  | 0 | When Timer expires, reload and start again. |
| 1 | TmrExpSens | 1 | Timer expiration is indicated by a logical 1. |
|  |  | 0 | Timer expiration is indicated by a logical 0. |
| 2 | TmrCtlSens | 0 | Timer is reloaded if TmrCtl=1, and decrements when TmrCtl=0. |
|  |  | 1 | Timer is reloaded if TmrCtl=0, and decrements when TmrCtl=1. |

Figure 5:
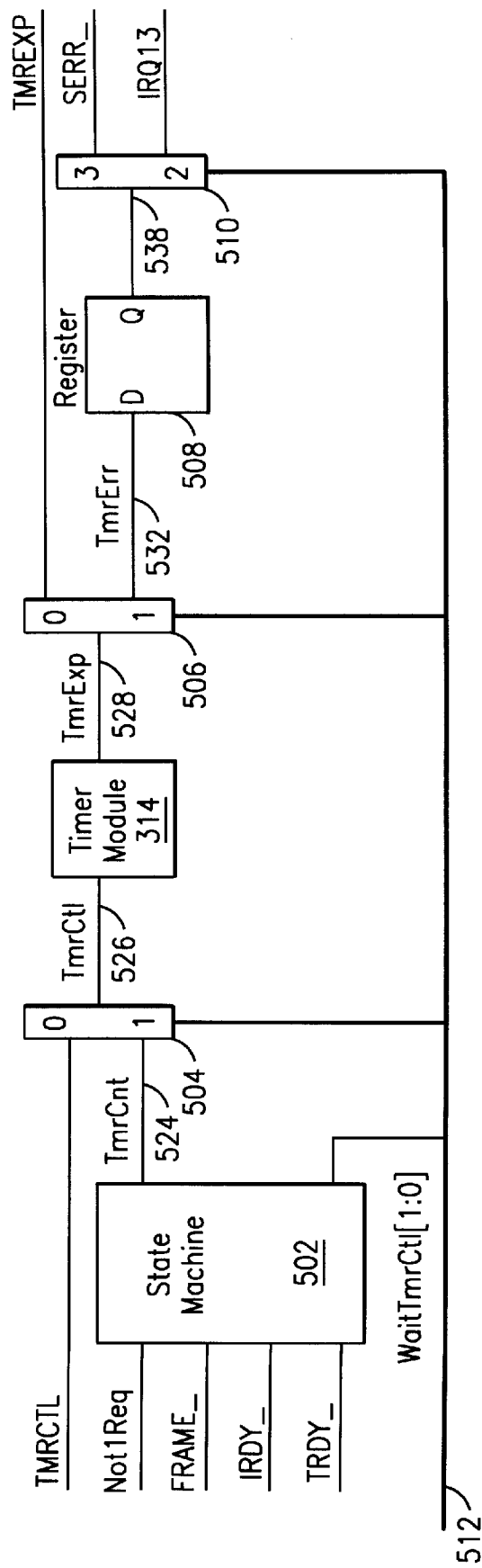
FIG. 5 illustrates a block diagram of an exemplary embodiment of a bus wait timer logic circuit provided in a bus protocol violation monitor system in accordance with the teachings of the present invention.

Referring now to FIG. 5, a block diagram of an exemplary embodiment of a bus wait timer logic circuit 500 is provided in accordance with the teachings of the present invention. A state machine 502 is preferably provided with a subset of PCI interface control signals, for example, the FRAME__, IRDY__ and TRDY__ signals, in addition to a synthesized signal, the Not1Req signal, that is produced to indicate if there has not been a REQ__ signal on a PCI bus, for example, the PCI buses 208A or 208B, in a given time period. As can be appreciated by those skilled in the art, the given time period may be programmable by a variety of software, hardware or firmware means. Responsive to these input signals, the state machine 502 generates an output signal, TmrCnt 524. The TMRCTL signal and the TmrCnt signal are multiplexed by a multiplexer or data selector 504 whose output comprises the TmrCtl signal 526. A control input signal WaitTmrCtl[1:0] 512 is provided to control the multiplexer 504. The TmrExp signal output 528 from the timer module 314 is operated upon by a second data selector 506 to produce either a TMREXP signal or a WaitTmrErr signal 532, based upon the control input signal WaitTmrCtl 512. The WaitTmrErr signal 532 is provided to a DQ register 508 and a third data selector 510 to ultimately generate an interrupt signal, the IRQ13 signal, or the SERR__ signal. In accordance with the teachings of the present invention, the SERR__ signal is subsequently converted to a Non-Maskable Interrupt (NMI) to indicate a catastrophic condition associated with the PCI buses 208A or 208B in relation to their respective interface control signals.

It should be appreciated that the timer module 314 provided in the wait timer logic circuit 500 may also be operated without being utilized in a "bus monitoring" or "bus observing" functionality by controlling the control input signal WaitTmrCtl 512. In the "bus monitoring" or "bus observing" functionality, the wait timer logic circuit 500 provides a simple yet efficient solution for detecting various anomalous conditions or violations associated with a bus in relation to its interface control signals or "control protocol." As has been remarked in the foregoing, these control protocol violations may give rise to a bus lock-up or hang condition. Some of the exemplary control protocol violations that typically generate a bus hang are as follows: the FRAME__ signal is stuck HIGH or LOW; the TRDY__ signal is stuck LOW or is not asserted in response to a valid assertion of the IRDY__ signal from a master, the PCI arbiter 304 does not grant the bus to any master, et cetera. Another bus condition, known as a "livelock" condition, may also be generated due to a control protocol violation. In the livelock condition, a bus remains oscillatory, although no data is actually transmitted among the bus devices or agents.

In a presently preferred exemplary embodiment, the programmable timer module 314 may be advantageously used in accordance with teachings provided herein for setting up an appropriate time window (temporal threshold) for monitoring or observing the occurrence of various bus control protocol violations. Furthermore, a numeric threshold for these protocol violations may also be preferably provided. A prioritized scheme for responding to various anomalous conditions may preferably be predicated upon a combination of the thresholds and the type of the condition. A "low-priority" action may involve capturing the protocol violation information and storing it in a location for future diagnostic purposes. A "medium-priority" action may involve generating an interrupt, such as the IRQ13 signal shown in FIG. 5, such that an interrupt handler may be triggered. A "high-priority" action may involve asserting the SERR__ signal for creating an NMI to indicate a catastrophic condition such as, for example, the livelock condition.

Figure 6:
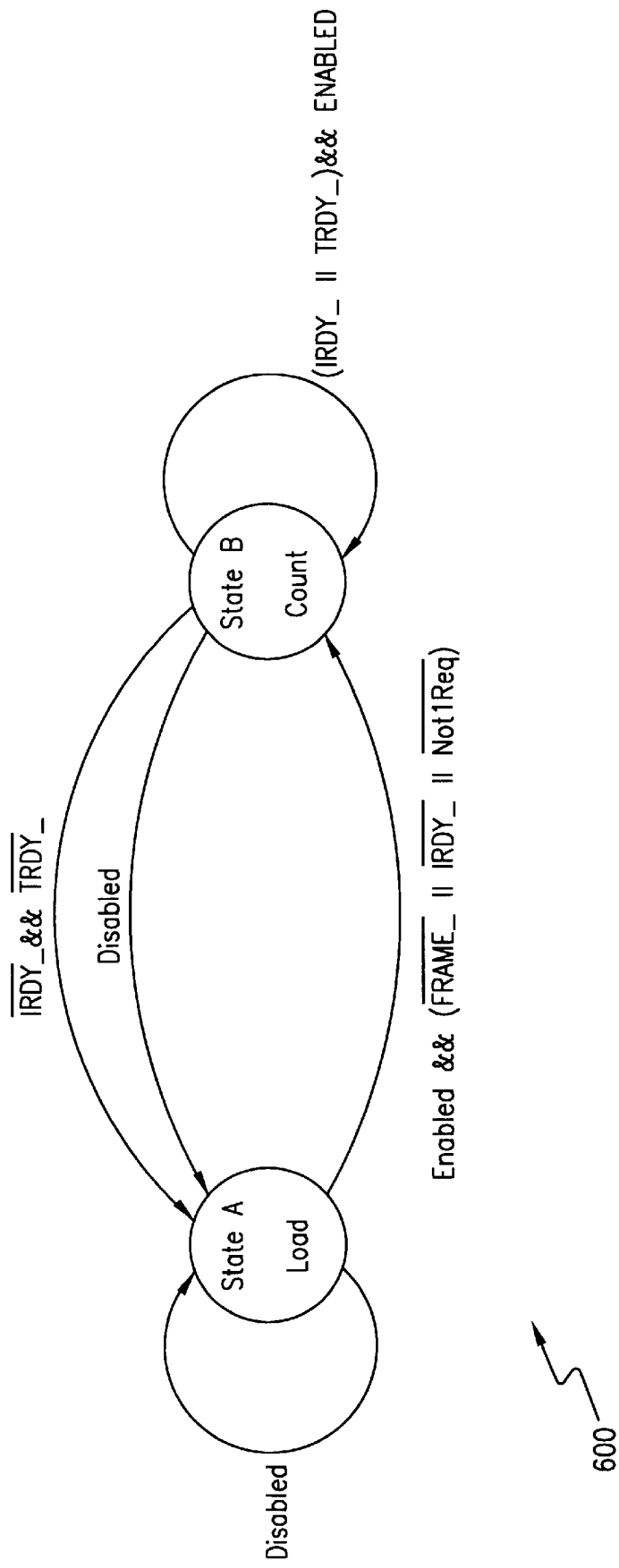
FIG. 6 depicts an exemplary embodiment of a state diagram associated with a bus wait timer logic circuit in accordance with the teachings of the present invention.

Referring now to FIG. 6, there is depicted an exemplary state diagram, generally at 600, associated with the bus wait timer logic circuit 500 described hereinabove. As can be readily seen, the logic circuit 500 transitions between STATE A (timer load) and STATE B (timer count) depending, at least in part, upon the status of the interface control signals.

Figure 7:
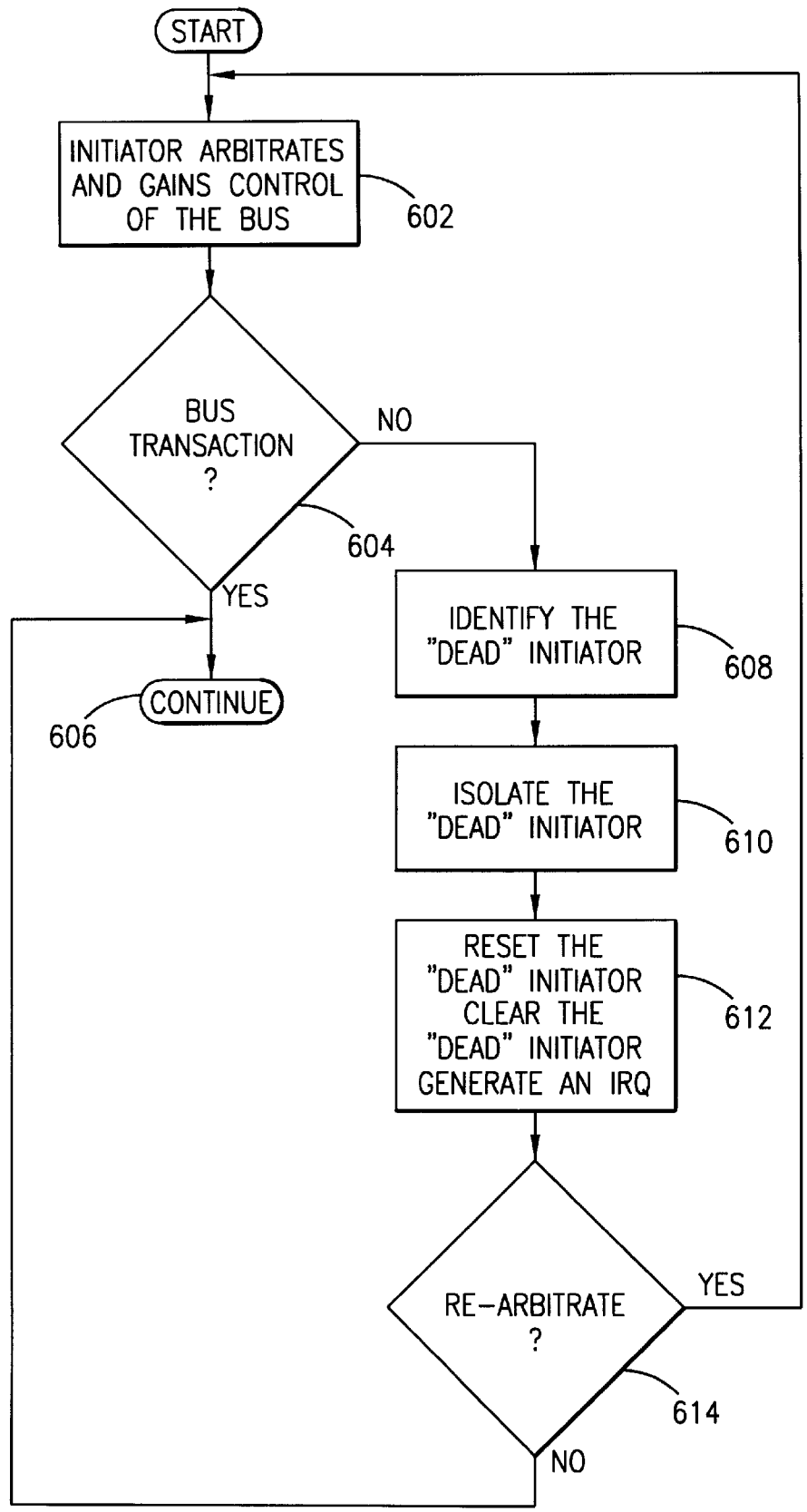
FIG. 7 depicts a flow diagram of a detection logic for detecting a non-responsive master after it has gained control of the bus.

It should be appreciated that the teachings of the present invention in one aspect may be advantageously utilized in detecting and isolating a non-responsive initiator or master on the bus. FIG. 7 depicts a flow diagram for effectuating a detection logic in accordance with the teachings of the present invention. After successfully arbitrating and gaining the control of the bus (step 602), the successful initiator does not commence a bus transaction by asserting the appropriate control signals (for example, the FRAME__ signal), although no protocol violations are apparent on the bus. The bus transaction occurrence is tested in the decision block 604, and if there is a proper commencement of the transaction, the transfer will continue in accordance with the bus protocol, as shown in step 606. If there is no bus transaction after gaining control of the bus, that initiator/master is identified as a "dead" master or initiator (step 608). It may be appreciated that such conditions might arise in the field because of various physical disturbances (for example, vibrations, collisions with other objects and humans, et cetera) that a system might be subjected to.

Continuing to refer to FIG. 7, the "dead" master is subsequently isolated (step 610) as to its device type and address. Based on implementational objectives, one or more of several actions, consolidated as step 612, may then take place. The condition that a master has become non-responsive after gaining control of the bus may simply be stored in a location that can be polled. A reset sequence appropriate for that master may be initiated if the master is provided with such a reset capability. In some implementations it may be appropriate to clear the "dead" master and then effectuate a re-arbitration (step 614). On the other hand, it is also possible to generate an appropriate interrupt which could be provided to an interrupt handler for further action.

Based on the foregoing Detailed Description, it can be readily understood that the teachings of the present invention provide a suite of systems and methods for detecting, monitoring and isolating various bus protocol violations relating to the control signals of a bus, for example, a PCI bus. By effective monitoring of the bus, bus lock-up or hang conditions resulting from protocol violations can be quickly observed so that appropriate actions may be taken by the system. Accordingly, the high availability and reliability aspects of the system are enhanced to the extent that the system performance is optimized thereby.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims. For example, the bus wait timer logic circuit 500 may be provided as a separate module in and of itself, rather than as a part of the application specific device 224. Upon reference hereto, it should be apparent that the state machine 502 may be implemented in a various ways. Moreover, instead of a three-level priority scheme as described in the foregoing, one of ordinary skill in the art can devise further levels of priority for different bus protocol violation events. In addition, various types of violations may be specifically defined such that these violations are not only related to the control protocol but also to the volume of the data that flows on the bus.

It should be understood that the "dead" master detection logic embodied in the flow diagram depicted in FIG. 7 may be implemented as a separate circuit as well. A programmable delay may be incorporated in the logic such that the presence of a frame initiation step from a non-responsive master is tested for the duration of the delay. Accordingly, it is envisaged that all these rearrangements, modifications, substitutions and extensions are comprehended within the scope of the present invention which is solely limited by the following claims.

What is claimed is:

1. A computer system, comprising:

a plurality of devices;

a bus for interconnecting said plurality of devices, said bus being operable with a protocol, which protocol comprises a control protocol portion;

a protocol violation monitor for monitoring a violation relating to said control protocol portion; and means for detecting a non-responsive master after said non-responsive master has gained control of said bus.

2. The computer system as set forth in claim 1, further comprising means for isolating said non-responsive master.

3. The computer system as set forth in claim 1, further comprising means for resetting said non-responsive master.

4. The computer system as set forth in claim 1, further comprising means for clearing said non-responsive master.

5. The computer system as set forth in claim 1, further comprising means for generating an interrupt signal responsive to said means for detecting.

6. A bus protocol monitoring method, comprising the steps of:

detecting whether there is a violation relating to a control protocol portion of said bus protocol;

generating information relating to said violation;

comparing said information to a threshold; and producing an interrupt responsive to said comparison step.

7. The bus protocol monitoring method as set forth in claim 6, wherein said interrupt comprises a non-maskable interrupt.

8. The bus protocol monitoring method as set forth in claim 6, wherein the detecting step comprises the step of:

monitoring the condition of at least one signal pertaining to said control protocol portion for a predetermined duration of time.

9. A system, comprising:

a plurality of devices;

a Peripheral Component Interconnect (PCI) bus for interconnecting said plurality of devices, said PCI bus being operable with a protocol, which protocol comprises a plurality of interface control signals; and a bus protocol violation monitor for monitoring a violation relating to at least one of said plurality of interface control signals, wherein said bus protocol violation monitor comprises:

a state machine for receiving at least a portion of said plurality of interface control signals, said state machine generating a timer counter signal responsive to said plurality of control signals;

means for generating at least one control input signal;

a programmable timer module having an input signal and an output signal;

a first data selector disposed between said state machine and said programmable timer module, said first data selector being actuatable responsive to said at least one control input signal;

a second data selector coupled to said output signal of said programmable timer module, said second data selector being actuatable responsive to said at least one control input signal;

a register coupled to said second data selector, said register at least for storing information relating to said violation; and a third data selector coupled to said register, said third data selector being actuatable in response, at least in part, to said at least one control input signal, said third data selector generating an indication of said violation.

10. The system as set forth in claim 9, wherein said indication comprises an interrupt.

11. The system as set forth in claim 9, wherein said indication comprises an assertion of an interface control signal.

12. A computer system, comprising:

a plurality of devices;

a bus for interconnecting said plurality of devices, said bus being operable with a protocol, which protocol comprises a control protocol portion; and a protocol violation monitor for monitoring a violation relating to said control protocol portion, wherein said protocol violation monitor comprises:

a state machine for receiving a plurality of control signals, which control signals comprise at least a portion of said control protocol portion, said state machine generating a timer counter signal responsive to said plurality of control signals;

first means for generating at least one control input signal; and second means for producing an indication that said violation relating to said control protocol portion has occurred.

13. The computer system as set forth in claim 12, wherein said second means comprises:

a programmable timer module having an input signal and an output signal;

a first data selector disposed between said state machine and said programmable timer module, said first data selector being actuatable responsive to said at least one control input signal;

a second data selector coupled to said output signal of said programmable timer module, said second data selector being actuatable responsive to said at least one control input signal;

a register coupled to said second data selector, said register at least for storing information relating to said violation; and a third data selector coupled to said register, said third data selector being actuatable responsive, at least in part, to said at least one control input signal, said third data selector generating said indication of said violation.

* * * * *